United States Patent
Park et al.

(10) Patent No.: US 12,492,511 B2
(45) Date of Patent: Dec. 9, 2025

(54) METHOD FOR MANUFACTURING ONION PULP FOR PAPER AND CAPSULE

(71) Applicant: Younhee Park, Manassas Park, VA (US)

(72) Inventors: Younhee Park, Manassas Park, VA (US); Dae-Long Park, Taebaek-si (KR)

(73) Assignee: Younhee Park, Manassas Park, VA (US)

( * ) Notice: Subject to any disclaimer, the term of this patent is extended or adjusted under 35 U.S.C. 154(b) by 0 days.

(21) Appl. No.: 18/932,727

(22) Filed: Oct. 31, 2024

(65) Prior Publication Data

US 2025/0270765 A1    Aug. 28, 2025

(30) Foreign Application Priority Data

Feb. 23, 2024   (KR) .................. 10-2024-0026657

(51) Int. Cl.
| | |
|---|---|
| *D21H 11/12* | (2006.01) |
| *D21H 17/02* | (2006.01) |
| *D21H 17/28* | (2006.01) |
| *D21H 17/31* | (2006.01) |

(52) U.S. Cl.
CPC ............ *D21H 11/12* (2013.01); *D21H 17/02* (2013.01); *D21H 17/28* (2013.01); *D21H 17/31* (2013.01)

(58) Field of Classification Search
CPC ................................ D21H 11/12; D21H 17/02
See application file for complete search history.

(56) References Cited

U.S. PATENT DOCUMENTS

2014/0350144 A1* 11/2014 Hepworth ............... C08L 1/02
                                                           156/60
2020/0165780 A1*  5/2020 Aoyama .................. D21F 9/00

FOREIGN PATENT DOCUMENTS

| CN | 108951268 A | * 12/2018 |
|---|---|---|
| KR | 10-0662043 B1 | 12/2006 |
| KR | 10-1257214 B1 | 4/2013 |
| KR | 10-2021-0148691 A | 12/2021 |
| KR | 10-2022-0105347 A | 7/2022 |
| KR | 10-2022-0160868 A | 12/2022 |
| KR | 10-2022-0166823 A | 12/2022 |

OTHER PUBLICATIONS

English machine translation of CN-108951268 A, 2018. (Year: 2018).*
Science Direct, Gelling agents, downloaded online May 2, 2025 from sciencedirect.com/ (Year: 2025).*

* cited by examiner

Primary Examiner — Anthony Calandra
(74) Attorney, Agent, or Firm — Revolution IP, PLLC

(57) ABSTRACT

A method of manufacturing onion pulp according to one embodiment of the present disclosure may include generating a ground onion product by grinding onions to remove sugar and sulfur components from the onions, mixing and stirring jelly powder and purified water at a predetermined ratio, heating a primary mixture in which the jelly powder and the purified water are mixed, stirring the primary mixture with the ground onion product, molding a final mixture, including the stirred jelly powder, purified water, and ground onion product, after placing the final mixture on a mold, and drying the molded final mixture.

11 Claims, 3 Drawing Sheets

METHOD FOR MANUFACTURING ONION PULP FOR PAPER AND CAPSULE

CROSS-REFERENCE TO RELATED APPLICATION

This application claims priority to and the benefit of Korean Patent Application No. 10-2024-0026657, filed on Feb. 23, 2024, the disclosure of which is incorporated herein by reference in its entirety.

BACKGROUND

1. Field of the Invention

The present disclosure relates to a method of manufacturing onion pulp for paper and capsules, and more particularly, to a method of manufacturing vegetable onion pulp that has ensured durability while being eco-friendly due to using onions and jelly powder.

2. Discussion of Related Art

On Earth, forests play a major role in alleviating climate change by absorbing carbon dioxide from the atmosphere, and as a habitat for various living things, they form an ecosystem on which numerous species depend.

Also, forests protect and maintain soil, influence crop production, filter and purify water, and provide economic livelihoods and cultural value to millions of people.

If forests, which provide such global value, are cut down, their natural functions may deteriorate, biodiversity may decrease, species extinction and ecosystem instability may result, soil erosion may have a negative impact on crop production, water pollution may increase, and social and economic instability may cause an industrial crisis.

In order to prevent such risks and crises and protect forests, it is important to strengthen forest protection policies and manage forests sustainably.

Also, as mankind has entered civilized society, the need for and importance of constant challenges and research and development toward "new paper" has been emphasized through a shift in innovative thinking regarding "paper," one of the products created through forest logging. Paper pulp is one of the materials used to make paper and paper products, and is generally made by processing wood from trees and the like.

Such paper pulp can be classified into chemical pulp made through a chemical method and mechanical pulp made through a mechanical method.

Among these, chemical pulp may be used when making paper of higher quality, and mechanical pulp may be used as pulp that has excellent strength and durability and is less expensive.

However, because the paper industry has a significant impact on the environment, producing paper pulp using more eco-friendly methods has recently emerged as a major issue in the industry.

To this end, efforts are being made to utilize renewable resources in the production process of paper pulp or to minimize pollution generated during a chemical processing process.

Also, pulp for capsules is one of the materials used to make pharmaceutical capsules mostly containing drugs and may be used to make capsules of various shapes and sizes that are used in the pharmaceutical industry.

For such pulp for capsules, sheets made using fibers of wood or the like may be processed into a form for manufacturing capsules.

In particular, pulp for capsules should be chemically stable, eco-friendly, and able to maintain an appropriate strength because it is used as an important material in the pharmaceutical industry.

In addition, conventional drug capsules are manufactured using protein-based gelatin ingredients obtained from cartilage, skin, bones, and the like of animals, but there is a problem in that indigestion may be caused in the body depending on the person taking the capsules, and there is also a problem that vegetarians cannot take the capsules.

RELATED ART DOCUMENTS

Patent Documents (Patent Document 0001) Korean Patent Registration No. 10-0662043 (Method of manufacturing bamboo pulp for paper making, pulp manufactured thereby, and method of making paper using the same)

(Patent Document 0002) Korean Patent Registration No. 10-1257214 (Method of manufacturing functional pulp and paper from coffee-grounds)

SUMMARY OF THE INVENTION

A method of manufacturing onion pulp for paper and capsules according to one embodiment of the present disclosure is an invention devised to address the above-described problems of the related art, and the present disclosure has advantages of protecting forests in the environment and helping to combat climate change and maintain the ecosystem by making pulp from onions instead of trees and making paper from the pulp.

Also, in the present disclosure, since pulp is made from onions, it is possible to save processing costs and cultivation time and to increase production speed, and thus significantly improve productivity from an economic perspective, and from a social perspective, it is possible to protect the Earth's forests, protect animals unlike animal capsules mostly made from animal skin, prevent harm to the natural environment, be safer for humans due to the pulp decomposing quickly in the human digestive system, and particularly, improve the quality of life for vegetarians and provide a foundation for a better life for humanity.

Also, the present disclosure may be a foundational technology that plays an important role in providing jobs and producing food in the agricultural sector.

Specifically, the present disclosure can provide a method of manufacturing onion pulp for paper and capsules in which the onion pulp is manufactured by mixing jelly powder and a ground onion product, thereby making the pulp more eco-friendly and ensuring the durability of the pulp.

Also, one embodiment of the present disclosure can provide a method of manufacturing onion pulp for paper and capsules in which a proportion of jelly powder is designed to have an optimal value through an experiment to secure cohesive force and tensile force.

Also, one embodiment of the present disclosure can provide a method of manufacturing onion pulp for paper and capsules in which an unpleasant smell of onions is removed through a step of removing sugar and sulfur from the onions, and formation of dried onion sheets is improved so that the dried onion sheets can be easily separated from a mold.

In addition, one embodiment of the present disclosure can provide a method of manufacturing onion pulp for paper and capsules in which unique components of onions are utilized to enable capsules themselves to provide useful functions to the human body.

One embodiment of the present disclosure provides a method of manufacturing onion pulp, the method including generating a ground onion product by grinding onions to remove sugar and sulfur components from the onions, mixing and stirring jelly powder and purified water at a predetermined ratio, heating a primary mixture in which the jelly powder and the purified water are mixed, stirring the primary mixture with the ground onion product, molding a final mixture, including the stirred jelly powder, purified water, and ground onion product, after placing the final mixture on a mold, and drying the molded final mixture.

The jelly powder may be made of mung bean jelly powder.

The jelly powder may be made of acorn jelly powder.

The jelly powder may be made of agar jelly powder.

In manufacturing onion pulp for paper, a ratio of the jelly powder to the purified water may be 1:60.

In manufacturing onion pulp for capsules, a ratio of the jelly powder to the purified water may be 1:70.

The generating of the ground onion product may include primarily grinding the onions after compressing the onions, secondarily grinding the primarily ground onions, and washing the ground onions with the purified water.

The drying of the molded final mixture may include drying the final mixture at a temperature of 65° C. for an amount of time ranging from one hour and thirty minutes to two hours and thirty minutes.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION OF THE INVENTION

Figure 1:
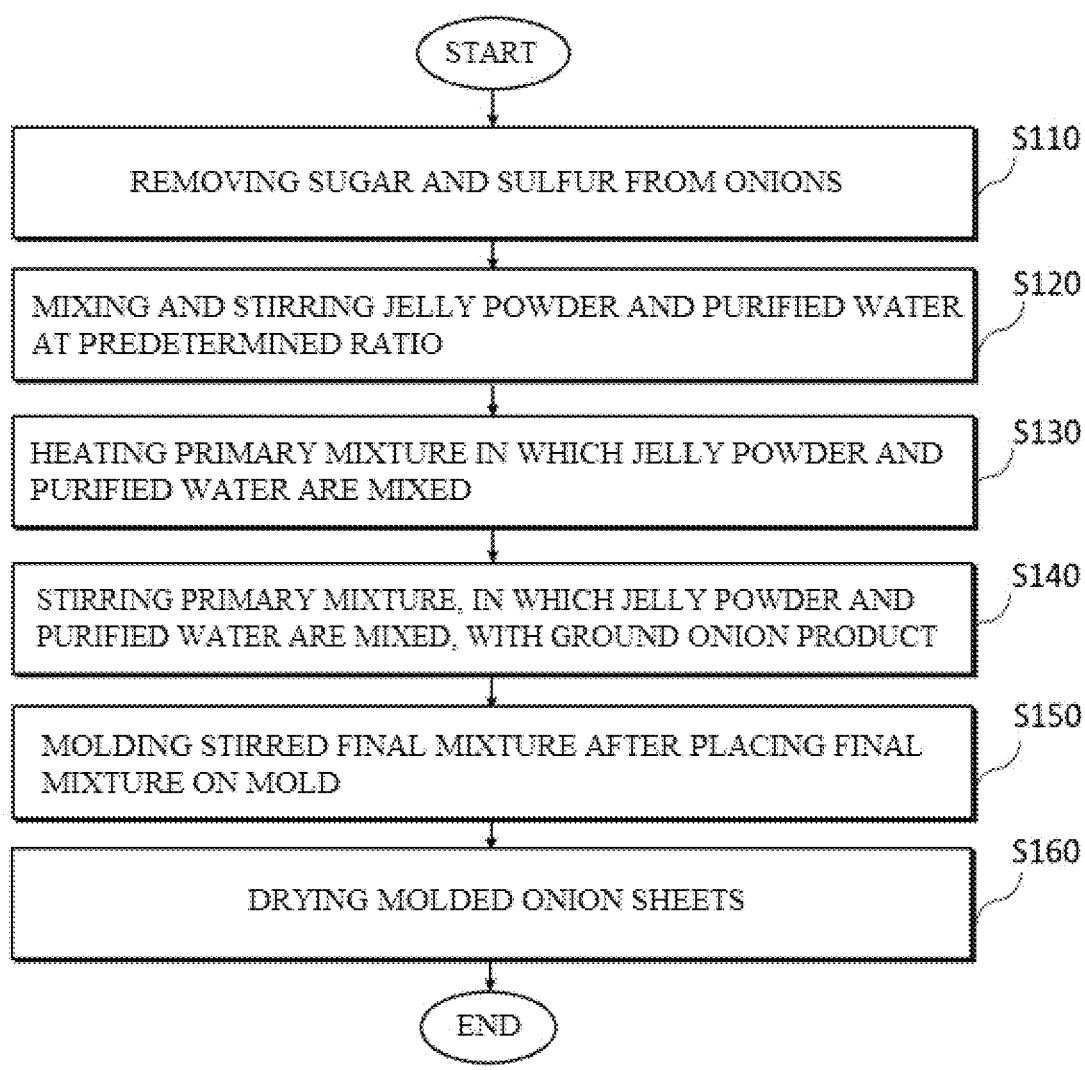
FIG. 1 is a flowchart illustrating a method of manufacturing onion pulp for paper and capsules according to one embodiment of the present disclosure.

Embodiments described herein and configurations illustrated in the drawings are merely exemplary embodiments of the present disclosure, and various modifications which may replace the embodiments and the drawings herein may be present at the time of filing this application.

Also, like reference numerals or symbols presented in the drawings of the application indicate parts or elements that perform substantially the same functions.

Also, terms used herein are for describing the embodiments and are not intended to limit and/or restrict the disclosure. A singular expression includes a plural expression unless the context clearly indicates otherwise.

In the application, terms such as "include" or "have" are for designating that features, numbers, steps, operations, elements, parts, or combinations thereof are present, and do not preclude the possibility of presence or addition of one or more other features, numbers, steps, operations, elements, parts, or combinations thereof in advance.

Also, terms including ordinals such as "first" and "second" used herein may be used to describe various elements, but the elements are not limited by the terms, and the terms are only used for the purpose of distinguishing one element from another element.

For example, a first element may be referred to as a second element without departing from the scope of rights of the present disclosure, and likewise, a second element may also be referred to as a first element. The term "and/or" includes a combination of a plurality of associated listed items or any one item among the plurality of associated listed items.

Hereinafter, embodiments according to the present disclosure will be described in detail with reference to the accompanying drawings.

Figure 2:
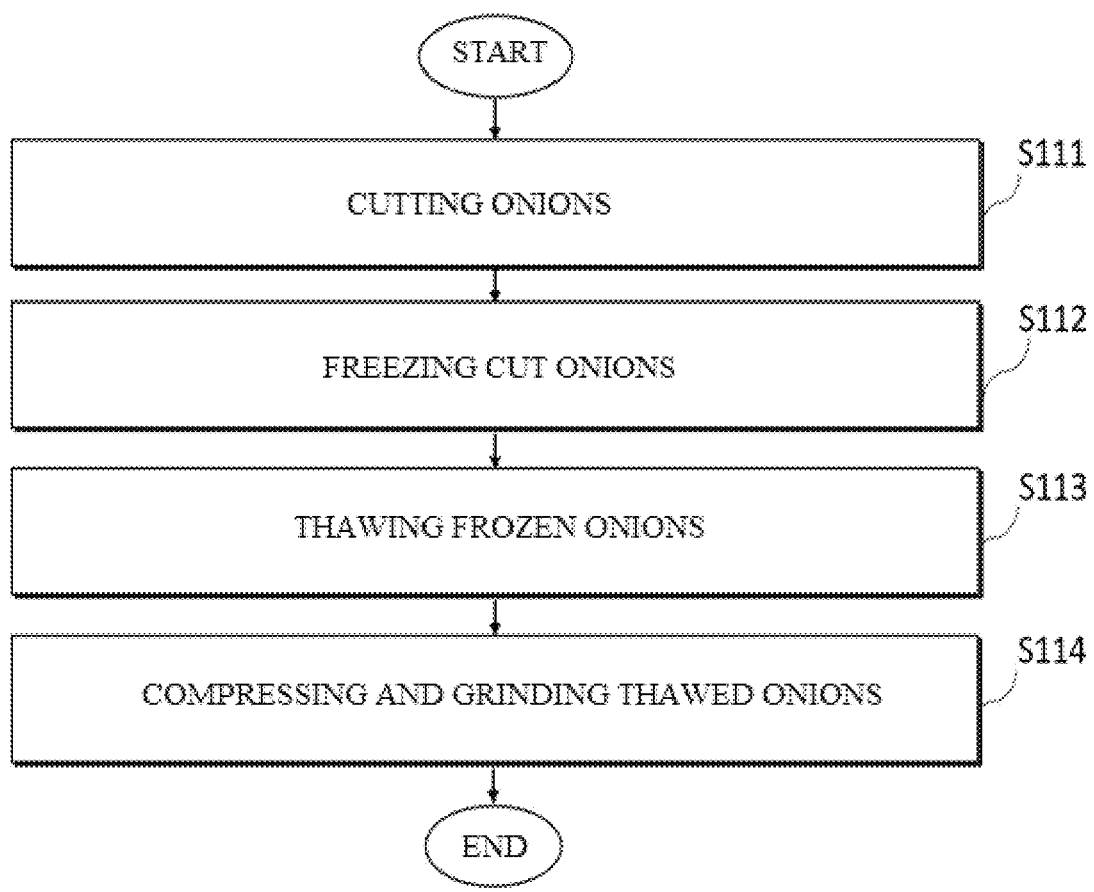
FIG. 2 is a view illustrating a method of removing sugar and sulfur from onions in the method of manufacturing onion pulp for paper and capsules according to one embodiment of the present disclosure.
Figure 3:
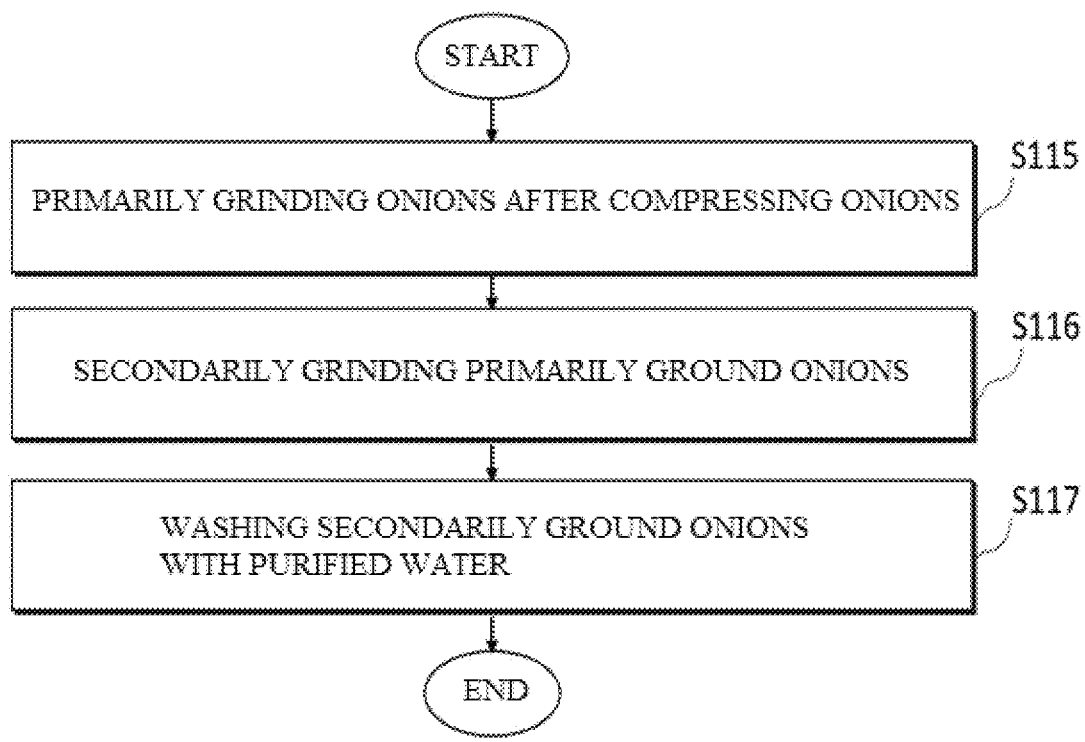
FIG. 3 is a view illustrating another method of removing sugar and sulfur from onions in the method of manufacturing onion pulp for paper and capsules according to one embodiment of the present disclosure.

FIG. 1 is a flowchart illustrating a method of manufacturing onion pulp for paper and capsules according to one embodiment of the present disclosure. FIG. 2 is a view illustrating a method of removing sugar and sulfur from onions in the method of manufacturing onion pulp for paper and capsules according to one embodiment of the present disclosure. FIG. 3 is a view illustrating another method of removing sugar and sulfur from onions in the method of manufacturing onion pulp for paper and capsules according to one embodiment of the present disclosure.

Referring to FIG. 1, in a method of manufacturing onion pulp for paper and capsules according to one embodiment of the present disclosure, onion pulp may be manufactured through a plurality of steps using jelly powder and a ground onion product.

The method of manufacturing onion pulp for paper and capsules that is shown in FIG. 1 only shows parts that are common between a method of manufacturing onion pulp for paper and a method of manufacturing onion pulp for capsules according to one embodiment of the present disclosure, and factors such as a proportion of jelly powder, a size of pieces of onions being compressed and ground, and the final thickness of onion pulp are different between the method of manufacturing onion pulp for paper and the method of manufacturing onion pulp for capsules according to the present disclosure.

Also, the term "onion pulp" used herein refers to a rolled form of molded and dried "onion sheets," and a method of forming onion sheets will be described below in detail.

First, a method of manufacturing onion pulp for paper according to one embodiment of the present disclosure will be described below.

Specifically, the method of manufacturing onion pulp for paper according to one embodiment of the present disclosure may include removing sugar and sulfur from onions (S110).

More specifically, the removing of the sugar and sulfur from the onions (S110) may be performed by a method of removing sugar and sulfur from onions using a drip phenomenon and an osmotic pressure principle, which is the method illustrated in FIG. 2, or may be performed by a method of removing sugar and sulfur from onions by physically destroying onion tissue through a compression grinder, which is the method illustrated in FIG. 3.

For example, as illustrated in FIG. 2, the removing of the sugar and sulfur from the onions (S110) according to the method of removing sugar and sulfur from onions using the drip phenomenon and the osmotic pressure principle of the present disclosure may include cutting onions (S111).

The drip phenomenon is a phenomenon in which moisture and various components flow out of a specific object during the process of freezing and thawing the object.

Specifically, the cutting of the onions (S111) may include cutting the onions into quadrangular shapes.

In this case, pieces of the cut onions may be formed with a width ranging from 0.1 mm to 1.5 mm.

Next, the removing of the sugar and sulfur from the onions (S110) according to the method of removing sugar and sulfur from onions using the drip phenomenon and the osmotic pressure principle may include freezing the onions (S112).

More specifically, the freezing of the onions (S112) may include adding purified water to the cut onions and slowly freezing the onions at a temperature of −18° C. or lower for 2 days or more.

When the onions are slowly frozen and thawed, a greater amount of onion tissue may be destroyed, the onions may have a soft texture when dried, the sugar and sulfur components may be rapidly removed, and the amount of removed sugar and sulfur may increase.

However, embodiments of the present disclosure are not limited thereto, and the freezing of the onions (S112) may also be implemented by slowly freezing the cut onions at a temperature of −18° C. or lower for 2 days or more without adding purified water to the onions.

Also, in the freezing of the onions (S112) according to one embodiment of the present disclosure, the freezing time of the onions may be changed according to the amounts of sugar and sulfur desired to be removed.

For example, in the freezing of the onions (S112) according to one embodiment of the present disclosure, the onions may be quick-frozen to form small, high-density ice crystals, and thus damage to the cell walls of the onions may be minimized.

Also, in the case of quick-freezing, since an amount of moisture lost during thawing is small, the amounts of sugar and sulfur removed from the onions may be smaller as compared to when freezing is not performed quickly.

Also, in the freezing of the onions (S112) according to one embodiment of the present disclosure, the onions may be frozen at a low speed to form large, low-density ice crystals, and thus damage to the cell walls of the onions may increase.

Accordingly, in the case of low-speed freezing, since an amount of moisture lost during thawing is large, the amounts of sugar and sulfur removed from the onions may be larger as compared to the case of quick-freezing.

Next, the removing of the sugar and sulfur from the onions (S110) according to the method of removing sugar and sulfur from onions using the drip phenomenon and the osmotic pressure principle may include thawing the frozen onions (S113).

Next, the removing of the sugar and sulfur from the onions (S110) according to the method of removing sugar and sulfur from onions using the drip phenomenon and the osmotic pressure principle may include compressing and grinding the thawed onions (S114).

The compressing and grinding of the thawed onions (S114) may include grinding the onions into predetermined sizes.

Pieces of a ground onion product used in the onion pulp for paper according to one embodiment of the present disclosure may be formed to have a width ranging from 0.8 mm to 1.5 mm.

As will be described below, pieces of a ground onion product used in the onion pulp for capsules according to one embodiment of the present disclosure may be formed to have a width ranging from 0.1 mm to 0.8 mm, unlike the pieces of the ground onion product used in the onion pulp for paper according to one embodiment of the present disclosure.

Accordingly, in the method of manufacturing onion pulp according to the present disclosure, by varying the size of the pieces of the ground onion product depending on the purpose of use of the onion pulp, the tensile force of the onion pulp may vary for each purpose of use.

Also, the compressing and grinding of the thawed onions (S114) may include adding salt to induce outflow of moisture and rapid outflow of sugar and sulfur components due to osmotic pressure.

More specifically, in the compressing and grinding of the thawed onions (S114) according to the present disclosure, salt may be added to the ground onions to induce discharge of sugar and sulfur from the onions using the osmotic pressure principle.

Accordingly, in the removing of the sugar and sulfur from the onions (S110), sugar and sulfur can be removed from the onions by thawing the frozen onions and grinding the thawed onions.

Also, as illustrated in FIG. 3, the removing of the sugar and sulfur from the onions (S110) by physically destroying onion tissue through a compression grinder according to the present disclosure may include primarily grinding onions after compressing the onions (S115).

More specifically, primarily grinding the onions after compressing the onions (S115) may include grinding peeled, unfrozen raw onions using a wet type compression grinder.

In this case, pieces of the primarily ground onions may be formed with a width ranging from 1.4 mm to 1.6 mm.

More preferably, the pieces of the primarily ground onions may be formed with a width of 1.5 mm.

Next, the removing of the sugar and sulfur from the onions (S110) by physically destroying onion tissue through a compression grinder according to the present disclosure may include secondarily grinding the onions (S116).

In this case, pieces of the secondarily ground onions may be formed with a width ranging from 0.8 mm to 1.2 mm.

As will be described below, pieces of a secondarily ground onion product used in the onion pulp for capsules according to one embodiment of the present disclosure may be formed to have a width ranging from 0.1 mm to 0.8 mm, unlike the pieces of the ground onion product used in the onion pulp for paper according to one embodiment of the present disclosure.

Accordingly, in the method of manufacturing onion pulp according to the present disclosure, by varying the size of the pieces of the ground onion product depending on the purpose of use of the onion pulp, the tensile force of the onion pulp may vary for each purpose of use.

Next, the removing of the sugar and sulfur from the onions (S110) by physically destroying onion tissue through a compression grinder according to the present disclosure may include washing the ground onions with purified water (S117).

The washing of the ground onions with the purified water (S117) may include washing the ground onions with salt water.

More specifically, in the removing of the sugar and sulfur from the onions (S110) by physically destroying onion tissue through a compression grinder according to the present disclosure, the sugar and sulfur removed from the onions together with moisture during grinding may be washed off through the washing of the ground onions with the purified water (S117), and in this way, the sugar and sulfur may be removed from the onions.

Also, in the removing of the sugar and sulfur from the onions (S110) by physically destroying onion tissue through a compression grinder according to the present disclosure, the size of the pieces of the ground onion product may vary depending on a ratio of sugar and sulfur desired to be removed.

Accordingly, in the method of manufacturing onion pulp for paper according to the present disclosure, by removing the sugar component from onions in various ways as described above, onion sheets dried on a mold or a Teflon film may be easily separated from the mold.

When the onion sheets are dried on the mold in a state in which the sugar component is not removed from the onions, due to the sugar component, there is a problem that the quality of the onion sheets is not assured because the onion sheets stick to the mold when the onion sheets are separated from the mold or the Teflon film.

Accordingly, through various methods of removing the sugar component from onions, the present disclosure has technical effects of allowing onion sheets to be easily separated from a mold and improving the quality of onion pulp formed by rolling the onion sheets.

Also, by removing the sulfur component from onions, the present disclosure has a technical effect of preventing the characteristic onion smell from coming out of the onion pulp for paper.

Next, the method of manufacturing onion pulp for paper according to one embodiment of the present disclosure may include mixing and stirring jelly powder and purified water at a predetermined ratio (S120).

More specifically, the mixing and stirring of the jelly powder and the purified water at the predetermined ratio (S120) may include mixing mung bean jelly powder and purified water at a ratio ranging from 1:50 to 1:62.

When a proportion of the mung bean jelly powder is greater than the above proportion, excessive hardening may occur during drying of the mung bean jelly powder and the ground onion product, and the tensile force of the onion pulp for paper may weaken.

Accordingly, the present disclosure may include mixing and stirring mung bean jelly powder and purified water at a ratio of 1:60 to implement a tensile force that is most suitable for use in paper.

The mung bean jelly powder may have a property of congealing when mixed with water.

The mung bean jelly powder may include a protein component extracted from a seaweed such as sea mustard or kelp.

Also, the mung bean jelly powder may be present in a fine powder form with a polysaccharide, such as amylose or amylopectin, or a protein as its main component.

Accordingly, when the mung bean jelly powder is mixed with water such as purified water, the mung bean jelly powder may be absorbed and thoroughly distributed in the water.

Here, an aqueous solution of the mung bean jelly powder may be gelated as a protein component of mung bean starch or acorn starch interacts with water.

Accordingly, through gelation, the state of the aqueous solution of the mung bean jelly powder may be changed to a branched polymer forming connections between chains, and as the connections continue, the branched polymer may be changed to a larger branched polymer and may be made of a single polymer.

Also, the jelly powder according to the present disclosure is not limited to the mung bean jelly powder including mung bean starch, and may be implemented as acorn jelly powder including acorn starch. Also, the jelly powder according to the present disclosure may be implemented as agar jelly powder.

In this case, the proportion of the acorn jelly powder may be configured to be the same as the proportion of the mung bean jelly powder.

Next, the method of manufacturing onion pulp for paper according to one embodiment of the present disclosure may include heating a primary mixture in which the jelly powder and the purified water are mixed (S130).

More specifically, the heating of the primary mixture in which the jelly powder and the purified water are mixed (S130) may include heating the primary mixture to 100° C., heating the primary mixture for five more seconds after 100° C. is reached, and stopping heating.

Specifically, when the jelly powder is heated for an excessive amount of time, there are problems in that starch molecules in the jelly powder made of the mung bean jelly powder or acorn jelly powder are decomposed, and thus bonding between the ground onion product and the starch of the jelly powder is weakened, which weakens the cohesive force, elastic force, and tensile force of onion pulp which is the final product.

Accordingly, by controlling the heating time of the primary mixture in which the jelly powder and purified water are mixed to be within a certain range, the present disclosure has a technical effect of securing the cohesive force, elastic force, and tensile force of the onion pulp.

Next, the method of manufacturing onion pulp for paper according to one embodiment of the present disclosure may include stirring the primary mixture, in which the jelly powder and purified water are mixed, with the ground onion product from which sugar and sulfur are removed (S140).

More specifically, the stirring of the primary mixture, in which the jelly powder and purified water are mixed, with the ground onion product from which sugar and sulfur are removed (S140) may include stirring in a container to allow the sugar component remaining in the ground onion product and the starch component of the jelly powder to bond.

Here, the ground onion product may be stirred after being added at a weight of 80% of the weight of initially added purified water.

Also, in this case, the sugar component and sulfur component may be removed at a certain level from the ground onion product through the removing of the sugar and sulfur from the onions (S110), and the ground onion product may be stirred with the primary mixture, including the jelly powder and purified water, while the moisture content of the ground onion product is 120%.

Next, the method of manufacturing onion pulp for paper according to one embodiment of the present disclosure may include molding a stirred final mixture after placing the final mixture on a mold (S150).

More specifically, the final mixture may be defined as including the stirred ground onion product, jelly powder, and purified water.

Specifically, the molding of the final mixture after placing the final mixture on the mold (S150) may include forming onion sheets with a thickness ranging from 0.4 mm to 0.8 mm in the case of onion pulp for paper according to the present invention.

Next, the method of manufacturing onion pulp for paper according to one embodiment of the present disclosure may include drying the molded onion sheets (S160).

More specifically, the drying of the molded onion sheets (S160) may include drying the onion sheets at a temperature of 65° C. for an amount of time ranging from one hour and thirty minutes to two hours and thirty minutes.

More preferably, the onion sheets may be dried for two hours.

Accordingly, in the method of manufacturing onion pulp for paper according to the present disclosure, by appropriately controlling the drying temperature and drying time of onion sheets, the cohesive force, elastic force, and tensile force of the final onion sheets may be suitable for use in paper.

Next, a method of manufacturing onion pulp for capsules according to one embodiment of the present disclosure will be described.

Specifically, the method of manufacturing onion pulp for capsules according to one embodiment of the present disclosure may include removing sugar and sulfur from onions (S110).

More specifically, the removing of the sugar and sulfur from the onions (S110) may be performed by a method of removing sugar and sulfur from onions using a drip phenomenon and an osmotic pressure principle, which is the method illustrated in FIG. 2, or may be performed by a method of removing sugar and sulfur from onions by physically destroying onion tissue through a compression grinder, which is the method illustrated in FIG. 3.

For example, as illustrated in FIG. 2, the removing of the sugar and sulfur from the onions (S110) according to the method of removing sugar and sulfur from onions using the drip phenomenon and the osmotic pressure principle of the present disclosure may include cutting onions (S111).

The drip phenomenon is a phenomenon in which moisture and various components flow out of a specific object during the process of freezing and thawing the object.

Specifically, the cutting of the onions (S111) may include cutting the onions into quadrangular shapes.

In this case, pieces of the cut onions may be formed with a width ranging from 0.1 mm to 1.5 mm.

Next, the removing of the sugar and sulfur from the onions (S110) according to the method of removing sugar and sulfur from onions using the drip phenomenon and the osmotic pressure principle may include freezing the onions (S112).

More specifically, the freezing of the onions (S112) may include adding purified water to the cut onions and slowly freezing the onions at a temperature of −18° C. or lower for 2 days or more.

However, embodiments of the present disclosure are not limited thereto, and the freezing of the onions (S112) may also be implemented by slowly freezing the cut onions at a temperature of −18° C. or lower for 2 days or more without adding purified water to the onions.

Also, in the freezing of the onions (S112) according to one embodiment of the present disclosure, the freezing time of the onions may be changed according to the amounts of sugar and sulfur desired to be removed.

For example, in the freezing of the onions (S112) according to one embodiment of the present disclosure, the onions may be quick-frozen to form small, high-density ice crystals, and thus damage to the cell walls of the onions may be minimized.

Also, in the case of quick-freezing, since an amount of moisture lost during thawing is small, the amounts of sugar and sulfur removed from the onions may be smaller as compared to when freezing is not performed quickly.

Also, in the freezing of the onions (S112) according to one embodiment of the present disclosure, the onions may be frozen at a low speed to form large, low-density ice crystals, and thus damage to the cell walls of the onions may increase.

Accordingly, in the case of low-speed freezing, since an amount of moisture lost during thawing is large, the amounts of sugar and sulfur removed from the onions may be larger as compared to the case of quick-freezing.

Next, the removing of the sugar and sulfur from the onions (S110) according to the method of removing sugar and sulfur from onions using the drip phenomenon and the osmotic pressure principle may include thawing the frozen onions (S113).

Next, the removing of the sugar and sulfur from the onions (S110) according to the method of removing sugar and sulfur from onions using the drip phenomenon and the osmotic pressure principle may include compressing and grinding the thawed onions (S114).

The compressing and grinding of the thawed onions (S114) may include grinding the onions into predetermined sizes.

Pieces of a ground onion product used in the onion pulp for capsules according to one embodiment of the present disclosure may be formed to have a width ranging from 0.1 mm to 0.8 mm.

As described above, the pieces of the ground onion product used in the onion pulp for capsules according to one embodiment of the present disclosure may be formed to be smaller than the pieces of the ground onion product used in the onion pulp for paper according to one embodiment of the present disclosure.

Accordingly, in the method of manufacturing onion pulp according to the present disclosure, by varying the size of the pieces of the ground onion product depending on the purpose of use of the onion pulp, the tensile force of the onion pulp may vary for each purpose of use.

Also, the compressing and grinding of the thawed onions (S114) may include adding salt to induce outflow of moisture due to osmotic pressure.

More specifically, in the compressing and grinding of the thawed onions (S114) according to the present disclosure, salt may be added to the ground onions to induce discharge of sugar and sulfur from the onions using the osmotic pressure principle.

Accordingly, in the removing of the sugar and sulfur from the onions (S110) according to the present disclosure, sugar and sulfur can be removed from the onions by thawing the frozen onions and grinding the thawed onions.

Also, as illustrated in FIG. 3, the removing of the sugar and sulfur from the onions (S110) by physically destroying onion tissue through a compression grinder according to the present disclosure may include primarily grinding onions after compressing the onions (S115).

More specifically, primarily grinding the onions after compressing the onions (S115) may include grinding peeled, unfrozen raw onions using a wet type compression grinder.

In this case, pieces of the primarily ground onions may be formed with a width ranging from 1.4 mm to 1.6 mm.

More preferably, the pieces of the primarily ground onions may be formed with a width of 1.5 mm.

Next, the removing of the sugar and sulfur from the onions (S110) by physically destroying onion tissue through a compression grinder according to the present disclosure may include secondarily grinding the onions (S116).

In this case, pieces of the secondarily ground onions may be formed with a width ranging from 0.1 mm to 0.8 mm.

Accordingly, in the method of manufacturing onion pulp according to the present disclosure, by varying the size of the pieces of the ground onion product depending on the purpose of use of the onion pulp, the tensile force of the onion pulp may vary for each purpose of use.

Next, the removing of the sugar and sulfur from the onions (S110) by physically destroying onion tissue through a compression grinder according to the present disclosure may include washing the ground onions with purified water (S117).

More specifically, in the removing of the sugar and sulfur from the onions (S110) by physically destroying onion tissue through a compression grinder according to the present disclosure, the sugar and sulfur removed from the onions together with moisture during grinding may be washed off through the washing of the ground onions with the purified water (S117), and in this way, the sugar and sulfur may be removed from the onions.

Also, in the removing of the sugar and sulfur from the onions (S110) by physically destroying onion tissue through a compression grinder according to the present disclosure, the size of the pieces of the ground onion product may vary depending on a ratio of sugar and sulfur desired to be removed.

Accordingly, in the method of manufacturing onion pulp for capsules according to the present disclosure, by removing the sugar component from onions in various ways as described above, onion sheets dried on a mold or a Teflon film may be easily separated from the mold.

When the onion sheets are dried on the mold in a state in which the sugar component is not removed from the onions, due to the sugar component, there is a problem that the quality of the onion sheets is not assured because the onion sheets stick to the mold when the onion sheets are separated from the mold.

Accordingly, through various methods of removing the sugar component from onions, the present disclosure has technical effects of allowing onion sheets to be easily separated from a mold and improving the quality of onion pulp formed by rolling the onion sheets.

Also, by removing the sulfur component from onions, the present disclosure has a technical effect of preventing the characteristic onion smell from coming out of the onion pulp for capsules.

Specifically, the onion pulp for capsules is a kind of food that is orally administered to a user, and the sulfur removing step is also important in terms of usability.

Next, the method of manufacturing onion pulp for capsules according to one embodiment of the present disclosure may include mixing and stirring jelly powder and purified water at a predetermined ratio (S120).

More specifically, the mixing and stirring of the jelly powder and the purified water at the predetermined ratio (S120) may include mixing mung bean jelly powder and purified water at a ratio ranging from 1:63 to 1:83.

When a proportion of the mung bean jelly powder is greater than the above proportion, bonding between the mung bean jelly powder and the ground onion product may become stronger, and the tensile force of the onion pulp for capsules may weaken.

Accordingly, the present disclosure may include mixing and stirring mung bean jelly powder and purified water at a ratio of 1:70, unlike in the method of manufacturing onion pulp for paper, to implement a strength that is most suitable for use in capsules.

The mung bean jelly powder may have a property of congealing when mixed with water.

The mung bean jelly powder may include a protein component extracted from a seaweed such as sea mustard or kelp.

Also, the mung bean jelly powder may be present in a fine powder form with a polysaccharide, such as amylose or amylopectin, or a protein as its main component.

Accordingly, when the mung bean jelly powder is mixed with water such as purified water, the mung bean jelly powder may be absorbed and thoroughly distributed in the water.

Here, an aqueous solution of the mung bean jelly powder may be gelated as a protein component of mung bean starch or acorn starch interacts with water.

Accordingly, through gelation, the state of the aqueous solution of the mung bean jelly powder may be changed to a branched polymer forming connections between chains, and as the connections continue, the branched polymer may be changed to a larger branched polymer and may be made of a single polymer.

Also, the jelly powder according to the present disclosure is not limited to the mung bean jelly powder and may be implemented as acorn jelly powder.

In this case, the proportion of the acorn jelly powder may be configured to be the same as the proportion of the mung bean jelly powder.

Next, the method of manufacturing onion pulp for capsules according to one embodiment of the present disclosure may include heating a primary mixture in which the jelly powder and the purified water are mixed (S130).

More specifically, the heating of the primary mixture in which the jelly powder and the purified water are mixed (S130) may include heating the primary mixture to 100° C., heating the primary mixture for five more seconds after 100° C. is reached, and stopping heating.

Specifically, when the jelly powder is heated for an excessive amount of time, there are problems in that starch molecules in the jelly powder made of the mung bean jelly powder or acorn jelly powder are decomposed, and thus bonding between the ground onion product and the starch of the jelly powder is weakened, which weakens the cohesive force, elastic force, and tensile force of onion pulp which is the final product.

Accordingly, by controlling the heating time of the primary mixture in which the jelly powder and purified water are mixed to be within a certain range, the present disclosure has a technical effect of securing the cohesive force, elastic force, and tensile force of the onion pulp.

Next, the method of manufacturing onion pulp for capsules according to one embodiment of the present disclosure may include stirring the primary mixture, in which the jelly powder and purified water are mixed, with the ground onion product from which sugar and sulfur are removed (S140).

More specifically, the stirring of the primary mixture, in which the jelly powder and purified water are mixed, with the ground onion product from which sugar and sulfur are removed (S140) may include stirring in a container to allow the sugar component remaining in the ground onion product and the starch component of the jelly powder to bond.

Here, the ground onion product may be stirred after being added at a weight of 80% of the weight of initially added purified water.

Also, in this case, the sugar component and sulfur component may be removed at a certain level from the ground onion product through the removing of the sugar and sulfur from the onions (S110), and the ground onion product may be stirred with the primary mixture, including the jelly powder and purified water, while the moisture content of the ground onion product is 120%.

Next, the method of manufacturing onion pulp for capsules according to one embodiment of the present disclosure may include molding a stirred final mixture after placing the final mixture on a mold (S150).

More specifically, the final mixture may be defined as including the stirred ground onion product, jelly powder, and purified water.

Specifically, the molding of the final mixture after placing the final mixture on the mold (S150) may include forming onion sheets with a thickness ranging from 0.1 mm to 0.3 mm in the case of onion pulp for capsules according to the present invention.

Accordingly, the onion pulp for capsules according to the present disclosure may be molded to have a smaller thickness than the onion pulp for paper and may be formed to configure capsules of a smaller size than paper.

Next, the method of manufacturing onion pulp for capsules according to one embodiment of the present disclosure may include drying the molded onion sheets (S160).

More specifically, the drying of the molded onion sheets (S160) may include drying the onion sheets at a temperature of 65° C. for an amount of time ranging from one hour and thirty minutes to two hours and thirty minutes.

More preferably, the onion sheets may be dried for two hours.

Accordingly, in a method of manufacturing onion pulp for paper and capsules according to the present disclosure, the drying temperature and drying time of onion sheets may be appropriately controlled so that the cohesive force, elastic force, and tensile force of the final onion sheets are suitable for use in capsules.

Therefore, a method of manufacturing onion pulp for paper and capsules according to one embodiment of the present disclosure has advantages in that, since the onion pulp is manufactured by mixing jelly powder and a ground onion product, the pulp is more eco-friendly and the durability of the pulp can be ensured.

Also, a method of manufacturing onion pulp for paper and capsules according to one embodiment of the present disclosure has an advantage in that cohesive force and tensile force can be secured by designing a proportion of jelly powder to have an optimal value through an experiment.

Also, a method of manufacturing onion pulp for paper and capsules according to one embodiment of the present disclosure has advantages in that an unpleasant smell of onions is removed through a step of removing sugar and sulfur from the onions, and formation of dried onion sheets is improved so that the dried onion sheets can be easily separated from a mold or a Teflon film.

In addition, a method of manufacturing onion pulp for paper and capsules according to one embodiment of the present disclosure has an advantage in that, due to utilizing unique components of onions, capsules themselves can provide useful functions to the human body.

A method of manufacturing onion pulp for paper and capsules according to one embodiment of the present disclosure has advantages in that, since the onion pulp is manufactured by mixing jelly powder and a ground onion product, the pulp is more eco-friendly and the durability of the pulp can be ensured.

Also, a method of manufacturing onion pulp for paper and capsules according to one embodiment of the present disclosure has an advantage in that cohesive force and tensile force can be secured by designing a proportion of jelly powder to have an optimal value through an experiment.

Also, a method of manufacturing onion pulp for paper and capsules according to one embodiment of the present disclosure has an advantage in that, by removing an unpleasant smell and toxicity of onions caused by a sulfur component of the onions and removing a certain amount of a sugar component from the onions through a step of removing sugar and sulfur from the onions, formation of dried onion sheets can be improved so that the dried onion sheets are easily separated from a mold or a Teflon film.

In addition, a method of manufacturing onion pulp for paper and capsules according to one embodiment of the present disclosure has an advantage in that, due to utilizing unique components of onions such as quercetin, vitamin C, and potassium, capsules themselves can provide useful functions to the human body.

The embodiments have been described above using only some examples and drawings, but those of ordinary skill in the art may make various modifications and changes to the embodiments from the above description. For example, appropriate results may be achieved even when operations described herein are performed in a different order from the method described herein, and/or components such as a system, a structure, a device, and a circuit described herein are coupled or combined in different forms from the method described herein or replaced or substituted with other components or their equivalents. Therefore, other implementations and other embodiments equivalent to the claims below also fall within the scope of the claims.

What is claimed is:

1. A method of manufacturing onion pulp, the method comprising:
    generating a ground onion product by grinding onions to remove sugar and sulfur components from the onions;
    mixing and stirring jelly powder and purified water at a predetermined weight ratio, the jelly powder is made of mung bean jelly powder;
    heating a primary mixture in which the jelly powder and the purified water are mixed;
    stirring the heated primary mixture with the ground onion product;
    molding a final mixture, including the stirred jelly powder, purified water, and ground onion product, after placing the final mixture on a mold; and
    drying the molded final mixture.

2. The method of claim 1, wherein the predetermined weight ratio of the jelly powder to the purified water is 1:60.

3. The method of claim 1, wherein the predetermined weight ratio of the jelly powder to the purified water is 1:70.

4. The method of claim 1, wherein the generating of the ground onion product includes:
    primarily grinding the onions after compressing the onions to form primary ground onions;
    secondarily grinding the primarily ground onions to form secondary ground onions; and
    washing the second ground onions with purified water.

5. The method of claim 1, wherein the drying of the molded final mixture includes drying the final mixture at a temperature of 65° C. for an amount of time ranging from one hour and thirty minutes to two hours and thirty minutes.

6. The method of claim 1, wherein, in the heating step, the primary mixture is heated in which the jelly powder and the purified water are mixed for a predetermined time to prevent starch molecules in the jelly powder from decomposing.

7. A method of manufacturing onion pulp, the method comprising:

generating a ground onion product by grinding onions to remove sugar and sulfur components from the onions;

mixing and stirring jelly powder and purified water at a predetermined weight ratio, the jelly powder is made of acorn jelly powder;

heating a primary mixture in which the jelly powder and the purified water are mixed;

stirring the heated primary mixture with the ground onion product;

molding a final mixture, including the stirred jelly powder, purified water, and ground onion product, after placing the final mixture on a mold; and drying the molded final mixture.

8. The method of claim 7, wherein the predetermined weight ratio of the jelly powder to the purified water is 1:60.

9. The method of claim 7, wherein the predetermined weight ratio of the jelly powder to the purified water is 1:70.

10. The method of claim 7, wherein the generating of the ground onion product includes:

primarily grinding the onions after compressing the onions to form primary ground onions;

secondarily grinding the primarily ground onions to form secondary ground onions; and washing the second ground onions with purified water.

11. The method of claim 7, wherein the drying of the molded final mixture includes drying the final mixture at a temperature of 65° C. for an amount of time ranging from one hour and thirty minutes to two hours and thirty minutes.

* * * * *